(12) United States Patent
Miyoshi

(10) Patent No.: US 8,088,172 B2
(45) Date of Patent: Jan. 3, 2012

(54) DATA PROCESSING APPARATUS, DATA PROCESSING METHOD, AND COMPUTER READABLE MEDIUM

(75) Inventor: Nobukazu Miyoshi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1401 days.

(21) Appl. No.: 11/648,686

(22) Filed: Jan. 3, 2007

(65) Prior Publication Data

US 2007/0288756 A1   Dec. 13, 2007

(30) Foreign Application Priority Data

May 18, 2006   (JP) .................................. 2006-138469

(51) Int. Cl.
*G06F 12/14*   (2006.01)
(52) U.S. Cl. ............... 726/35; 726/26; 726/34; 713/193
(58) Field of Classification Search .................... 726/33, 726/35
See application file for complete search history.

(56) References Cited

U.S. PATENT DOCUMENTS

| | | | | |
|---|---|---|---|---|
| 5,758,121 | A * | 5/1998 | Fukuzumi | 711/164 |
| 6,026,457 | A | 2/2000 | Lee | |
| 7,216,362 | B1 * | 5/2007 | Strongin et al. | 726/16 |
| 7,263,190 | B1 * | 8/2007 | Moritz | 380/258 |
| 7,325,052 | B1 * | 1/2008 | Motoyama | 709/223 |
| 7,471,408 | B2 * | 12/2008 | Ueda et al. | 358/1.15 |
| 7,477,544 | B2 * | 1/2009 | Itou | 365/185.04 |
| 7,490,357 | B2 * | 2/2009 | Cho et al. | 726/29 |
| 2001/0016895 | A1 * | 8/2001 | Sakajiri et al. | 711/115 |
| 2002/0103964 | A1 * | 8/2002 | Igari | 711/112 |
| 2004/0027603 | A1 | 2/2004 | Ueda et al. | |
| 2007/0130434 | A1 * | 6/2007 | Chu et al. | 711/163 |

FOREIGN PATENT DOCUMENTS

| | | |
|---|---|---|
| JP | A-5-173669 | 7/1993 |
| JP | A-8-212016 | 8/1996 |
| JP | A-10-91287 | 4/1998 |
| JP | A-2004-13327 | 1/2004 |
| JP | A 2004-056347 | 2/2004 |
| JP | A 2004-255851 | 9/2004 |
| JP | A-2005-107855 | 4/2005 |
| JP | A-2005-236907 | 9/2005 |
| JP | A-2005-317143 | 11/2005 |
| JP | A-2006-139381 | 6/2006 |

OTHER PUBLICATIONS

Jun. 21, 2011 Office Action issued in Japanese Patent Application No. 2006-138469 (with translation).

* cited by examiner

*Primary Examiner* — Matthew Smithers
(74) *Attorney, Agent, or Firm* — Oliff & Berridge, PLC

(57) ABSTRACT

A data processing apparatus includes: a determination section that is connected to a storage and determines whether or not the storage is unauthorized; and a fraud handling section that erases information in all area of the storage as a fraud handling processing if the determination section determines that the connected storage is unauthorized.

15 Claims, 10 Drawing Sheets

DATA PROCESSING APPARATUS, DATA PROCESSING METHOD, AND COMPUTER READABLE MEDIUM

BACKGROUND

1. Technical Field

This invention relates to a data processing apparatus and a data processing method for determining whether or not storage is unauthorized and performing fraud handling processing, and a computer readable medium storing a data processing program capable of causing a data processing apparatus to determine whether or not storage placed in the data processing apparatus is unauthorized and to perform fraud handling processing.

2. Related Art

In recent years, a hard disk (also called HDD) has been used as a storage medium for retaining image data, etc., in an apparatus such as a copier or a printer. If HDD is stolen, the HDD is connected to another apparatus, whereby the image data, etc., retained in the HDD can be printed.

SUMMARY

According to an aspect of the present invention, a data processing apparatus includes: a determination section that is connected to a storage and determines whether or not the storage is unauthorized; and a fraud handling section that erases information in all area of the storage as a fraud handling processing if the determination section determines that the connected storage is unauthorized.

BRIEF DESCRIPTION OF THE DRAWINGS

Exemplary embodiment of the present invention will be described in detail based on the following figures, wherein.

DETAILED DESCRIPTION

Referring now to the accompanying drawings, there are shown preferred embodiments of the invention.

An outline of a first embodiment of the invention will be discussed.

A data processing apparatus determines whether or not connected storage is unauthorized and performs predetermined fraud handling processing if the storage is unauthorized. An example of the fraud handling processing is executed as follows:

(1) Stop processing other than the HDD fraud handling processing.
(2) Physically lock the HDD.
(3) Analyze the description of the fraud and send a notification.
(4) Erase data in all areas of the HDD.
(5) Overwrite the erosion areas with specific information.
(6) Send a notification of completion of the fraud handling processing.

The embodiment described below can be applied to an image processing apparatus as a data processing apparatus, more specifically to a scanner, a printer, a copier, a FAX, a multiple function processing machine (having a print function, a scan function, a FAX function, a copy function, etc.), etc., and data of a comparatively large capacity such as an image is stored in storage. As the storage, a hard disk is mainly illustrated in the description to follow.

Figure 1:
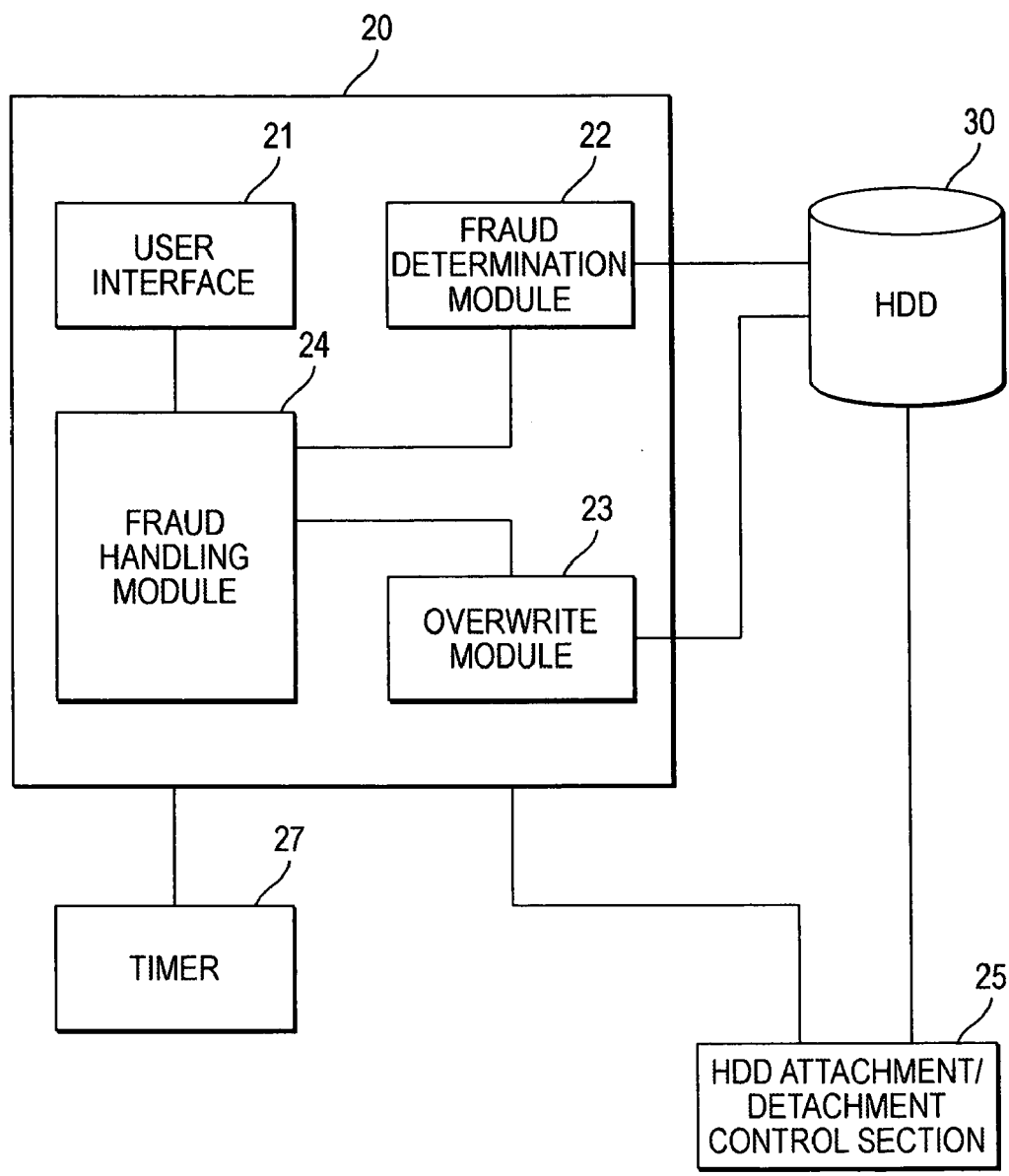
FIG. 1 is a schematic block diagram to illustrate a data processing apparatus.

FIGS. 1 to 5 show the first embodiment of the invention. FIG. 1 shows a conceptual module configuration example of the first embodiment of the invention.

A module refers to a generally and logically detachable part of software, hardware, etc. Therefore, the module in the embodiment means not only a module in a program, but also a module in the hardware configuration. Therefore, the embodiment described below also server as the description of an apparatus, a method, and a program. Modules are almost in a one-to-one correspondence with functions; however, in implementation, one module may be one program or two or more modules may make up one program or two or more programs may make up one module. Two or more modules may be executed by one apparatus or one module may be executed in two or more apparatus in a distributed or parallel environment. In the description to follow, the term "connection" contains not only physical connection, but also logical connection.

The apparatus is not only provided by connecting a plurality of computers, hardware, units, etc., through a network, etc., but also implemented as one apparatus.

A data processing apparatus 20 is connected to an HDD 30, an HDD attachment/detachment control section 25, and a timer 27, and contains a user interface 21, a fraud determination module 22, an overwrite module 23, and a fraud handling module 24.

The user interface 21 is connected to the fraud handling module 24 for displaying the processing result of fraud handling, etc., on a display for the operator using the data processing apparatus 20 and accepting a command from the operator.

The fraud determination module 22 is connected to the HDD 30 and the fraud handling module 24 for receiving a command from the fraud handling module 24, reading data in the HDD 30, and determining whether or not unauthorized processing has been performed. It sends the result to the fraud handling module 24.

The overwrite module 23 is connected to the HDD 30 and the fraud handling module 24 for receiving a command from the fraud handling module 24 and overwriting the HDD 30 for erasing data. It sends the result to the fraud handling module 24.

The fraud handling module 24 is connected to the user interface 21, the HDD 30, and the fraud handling module 24 for sending a processing command to the fraud determination module 22 or the overwrite module 23 upon reception of a command from the user interface 21 or based on predetermined processing. It sends the result to the user interface 21.

The HDD 30 is connected to the fraud determination module 22, the overwrite module 23, and the HDD attachment/detachment control section 25 and stores data of image data, etc. The fraud determination module 22 checks whether or not the HDD 30 is an unauthorized HDD and whether or not unauthorized (illegal) data is stored in the HDD 30. The overwrite module 23 rewrites the data in the HDD 30 with specific information, etc. Although the HDD 30 is detachable, the HDD attachment/detachment control section 25 electrically or mechanically permits or inhibits attachment/detachment of the HDD 30.

The HDD attachment/detachment control section 25 is connected to the data processing apparatus 20 and the HDD 30 for controlling attachment/detachment of the HDD 30 according to a command from the data processing apparatus 20.

The timer 27 is connected to the data processing apparatus 20 for performing timing processing according to a command of start, stop, alarm, etc., from the data processing apparatus 20.

Figure 2:
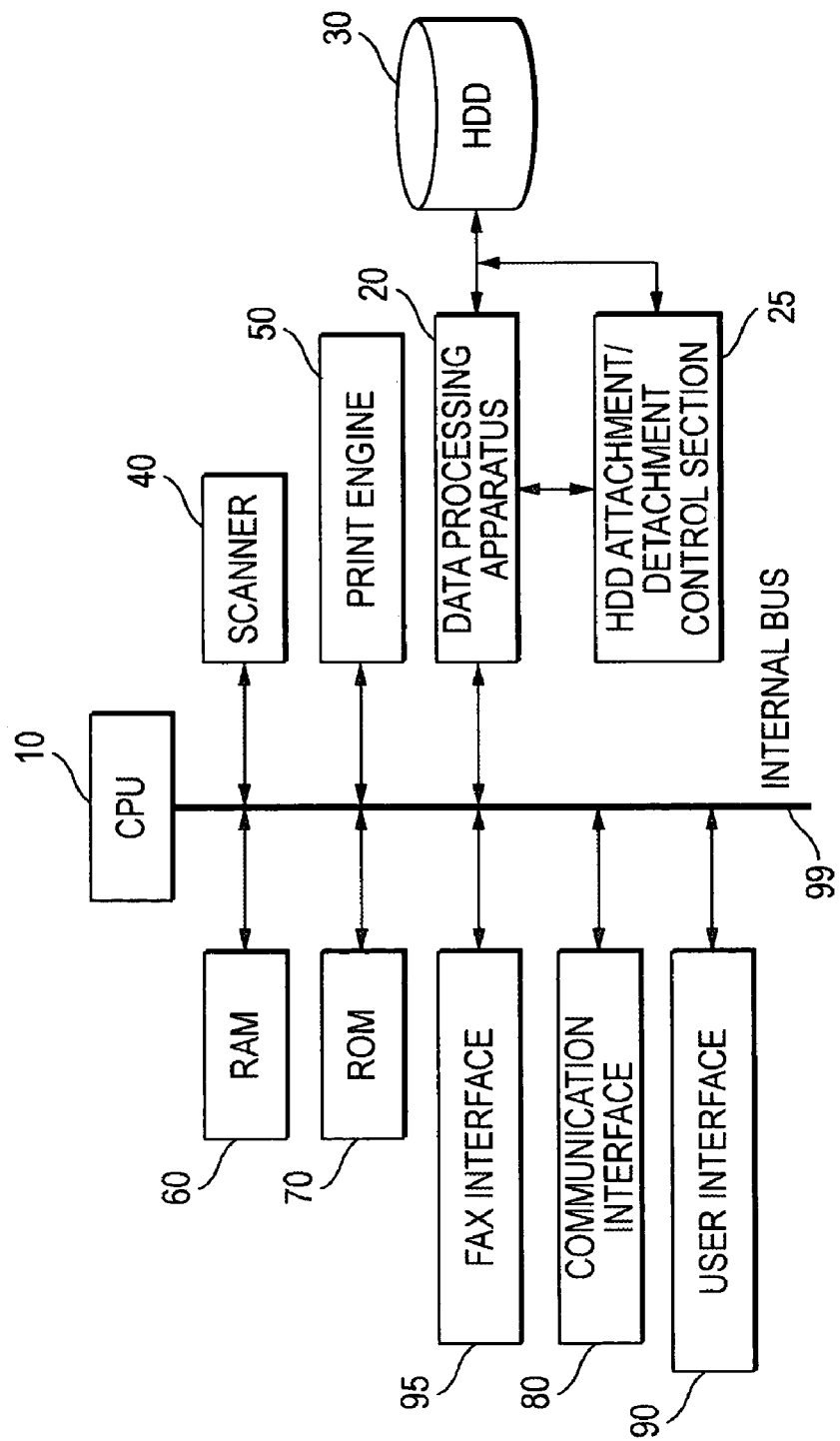
FIG. 2 is a schematic block diagram to illustrate hardware of a first data processing apparatus.

FIG. 2 is a schematic block diagram to illustrate hardware of the image processing apparatus implementing the embodiment. The hardware has a CPU 10, the data processing apparatus 20, the HDD attachment/detachment control section 25, the HDD 30, a scanner 40, a print engine 50, RAM 60, ROM 70, a communication interface 80, a user interface 90, a FAX interface 95, and an internal bus 99. The CPU 10 controls the whole image processing apparatus. The data processing apparatus 20 is connected to the HDD attachment/detachment control section 25 and the HDD 30 for storing and reading data in and from the HDD 30 according to a command from the CPU 10, etc. The RAM 60 stores a program, data, and image data. The ROM 70 stores fixed programs and data and mainly stores information required when power of the image processing apparatus is turned on. The HDD 30 is connected to the data processing apparatus 20 and the HDD attachment/detachment control section 25 and stores image data stored in the RAM 60. The communication interface 80 performs communication processing with a communication network and executes transmission and reception to and from other machines. The user interface 90 accepts operation of the operator of the image processing apparatus and produces display for the operator according to a command from the CPU 10. The scanner 40 inputs image data into the RAM 60. The print engine 50 prints out the image data in the RAM 60, etc. The FAX interface 95 conducts image signal communications as a FAX. The components are connected to the internal bus 99 for performing processing in conjunction with each other.

Figure 5:
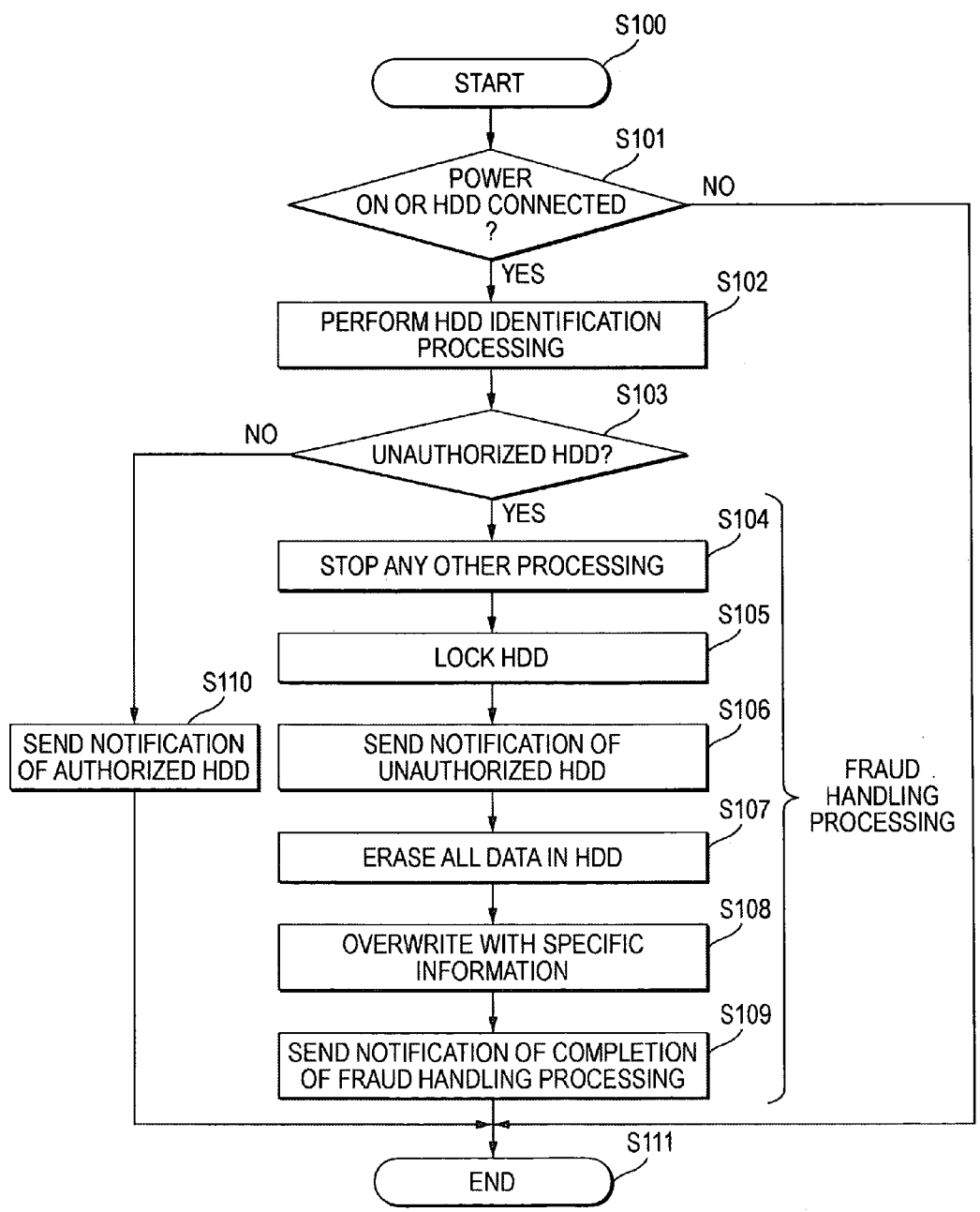
FIG. 5 is a flowchart of a first fraud handling processing example.

Next, the function and the operation will be discussed with a flowchart of FIG. 5.

As an identification method of the HDD 30 by the fraud determination module 22, when the power is turned on or when the HDD 30 is connected (step S101), data previously stored in an HDD identification information storage area of the HDD 30 is read and whether or not the data and the identification code unique to the apparatus in which the data processing apparatus 20 is installed match is determined (steps S102 and S103). Alternatively, virus check is executed for the data in the HDD 30 to determine whether or not unauthorized (illegal) data is stored. Whether or not the HDD 30 is unauthorized is determined by whether or not an HDD which is not an HDD essentially to be attached to the data processing apparatus 20 is attached, whether or not the data in the HDD 30 contains a virus program or the like, etc.

If the fraud determination module 22 determines that the HDD 30 is unauthorized (YES at step S103), it sends the result to the fraud handling module 24, which then performs the following fraud handling processing (steps S104 to S109). If the fraud determination module 22 does not determine that the HDD 30 is unauthorized (No at step S103), it sends the result to the fraud handling module 24, which then displays a message to the effect that the HDD is authorized on the user interface 90 through the user interface 21 (step S110). The fraud handling processing is as follows:

(1) Processing other than the HDD fraud handling processing is stopped (step 104). The stopped processing is physical shutdown of a FAX/communication net line, job interrupt, etc. The fraud handling module 24 commands the FAX interface 95, the communication interface 80, etc., to perform processing of inhibiting external communications through the internal bus 99. To perform physical shutdown, the fraud handling module 24 commands the user interface 21 to display a message such as "remove XX cable," for example, for the operator. The user interface 21 displays the message on the user interface 90 through the internal bus 99. The FAX interface 95, the communication interface 80, etc., sends a notification of removal of the cable to the data processing apparatus 20 and after receiving the notification, the fraud handling module 24 continues the fraud handling processing.

(2) The HDD 30 is physically locked (step S105) for fixing the HDD 30 to a state in which the HDD 30 cannot be taken out. The subsequent processing is performed for the identified HDD 30 and the HDD 30 is prevented from being replaced, etc., during the processing. For this purpose, the data processing apparatus 20 issues a command of fixing the HDD 30 to the HDD attachment/detachment control section 25, which then electrically or mechanically inhibits attachment/detachment of the HDD 30.

(3) The fraud determination module 22 analyzes the description of fraud according to a command of the fraud handling module 24 and sends the analysis result to the fraud handling module 24 (step S106). As the description of the fraud to be sent, first, unauthorized HDD identification code and the fact that the HDD is unauthorized are reported. Subsequently, the HDD area is scanned and if a code indicating that fraud handling processing was performed in the past is detected, information code concerning the past fraud handling processing (identification code of the data processing apparatus performing the fraud handling processing/date and time/user information, etc.,) stored following that code and the fact that fraud handling processing was performed in the past are reported. The information concerning the fraud handling processing sent to the fraud handling module 24 may be displayed on the user interface 90 through the user interface 21.

(4) The overwrite module 23 erases data in all areas of the HDD 30 according to a command of the fraud handling module 24 (step S107). For example, National Security Agency (NSA) recommendation method (overwrite with random numbers at the first and second times and overwrite with fixed values at the third time) or the like is used. Accordingly, it is made impossible to interpret the information stored before erasion.

(5) The overwrite module 23 overwrites previous data with specific information in the erasion area according to a command of the fraud handling module 24 (step S108). This means that all areas of the storage area of the HDD 30 are repeatedly overwritten with information code concerning the fraud handling processing (code indicating the fraud handling processing/identification code unique to the apparatus in which the data processing apparatus is installed/date and time/operator ID/past fraud information, etc.,) Since the fraud handling processing information is made up of one sector (512 bytes), each sector of the HDD 30 is overwritten with similar data.

All or some (for example, identification code unique to the apparatus, etc.,) of the information concerning the fraud handling processing may be encrypted. To shorten the time for overwriting the HDD 30 with specific information, only a portion of the storage area may be overwritten with the specific information or the storage area may be overwritten with the specific information rather than the fixed values at the third time of the erasure processing.

If the data is already written when the data in the HDD 30 is read, it means that the HDD 30 was subjected to previous fraud handling processing.

The specific information may be not only significant information, but also meaningless information (harmless data if it is processed).

(6) Completion of the fraud handling processing is displayed on the user interface 90 through the user interface 21 (step S109).

Figure 3:
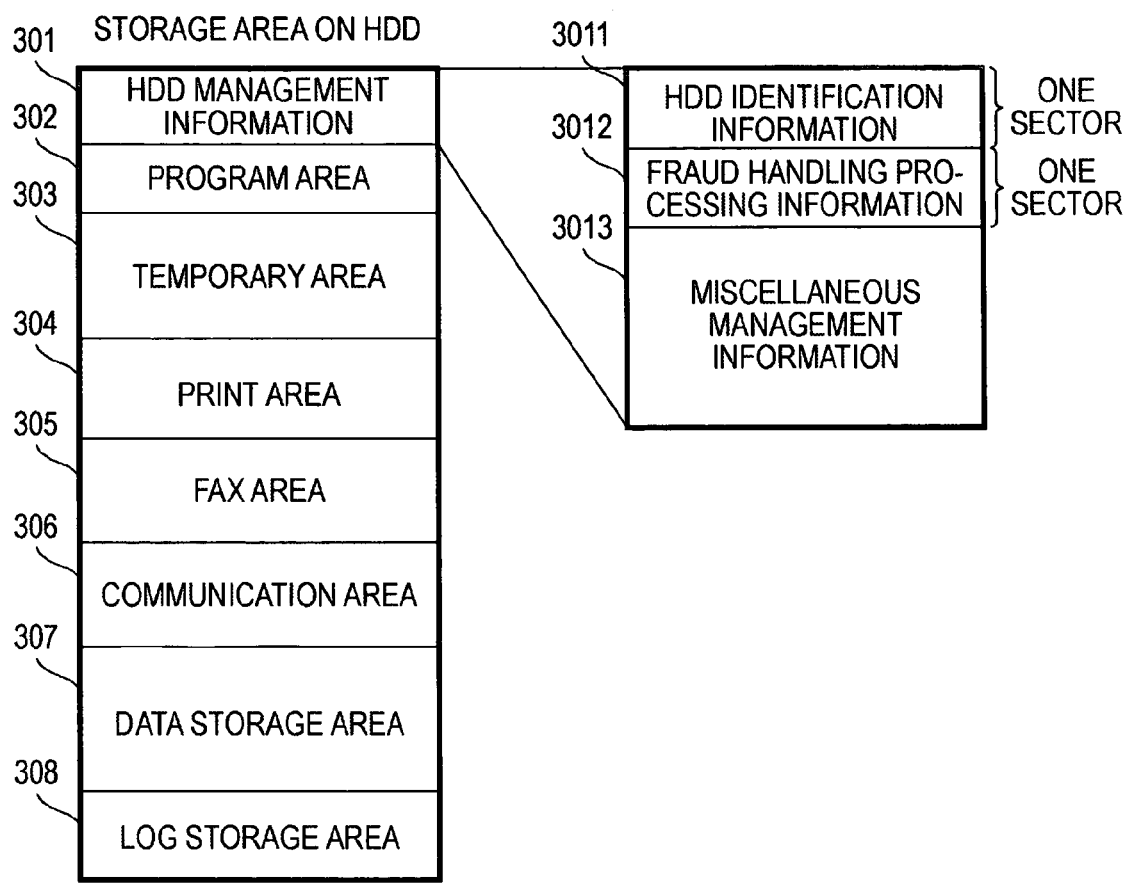
FIG. 3 is a schematic drawing to describe a storage area example on HDD.

How the HDD 30 is rewritten as the fraud handling processing is performed will be discussed with FIGS. 3 and 4. FIG. 3 shows a state before fraud handling processing is performed. The HDD 30 is divided into areas of HDD management information 301, a program area 302, a temporary area 303, a print area 304, a FAX area 305, a communication area 306, a data storage area 307, a log storage area 308, etc. For example, the print area 304 is an area used by the print engine 50. The HDD management information 301 is divided into HDD identification information 3011, fraud handling processing information 3012, and miscellaneous management information 3013. Each of the HDD identification information 3011 and the fraud handling processing information 3012 has a storage capacity of one sector. Information for identifying the HDD 30 is stored in the HDD identification information 3011. Identification information of the data processing apparatus 20 in which the HDD 30 is essentially to be placed or the like may be contained. When the HDD 30 is in a new state, the fraud handling processing information 3012 does not exist. If the HDD 30 is subjected to fraud handling processing, the fraud handling processing information 3012 is entered and the number of pieces of the fraud handling processing information 3012 may be varied depending on the number of times fraud handling processing has been performed. If the fraud handling processing information 3012 exists, the fraud determination module 22 may send the fact that fraud handling processing was performed in the past or the information stored in the fraud handling processing information 3012 to the fraud handling module 24, which then may display the fact or the information on the user interface 90 through the user interface 21.

Figure 4:
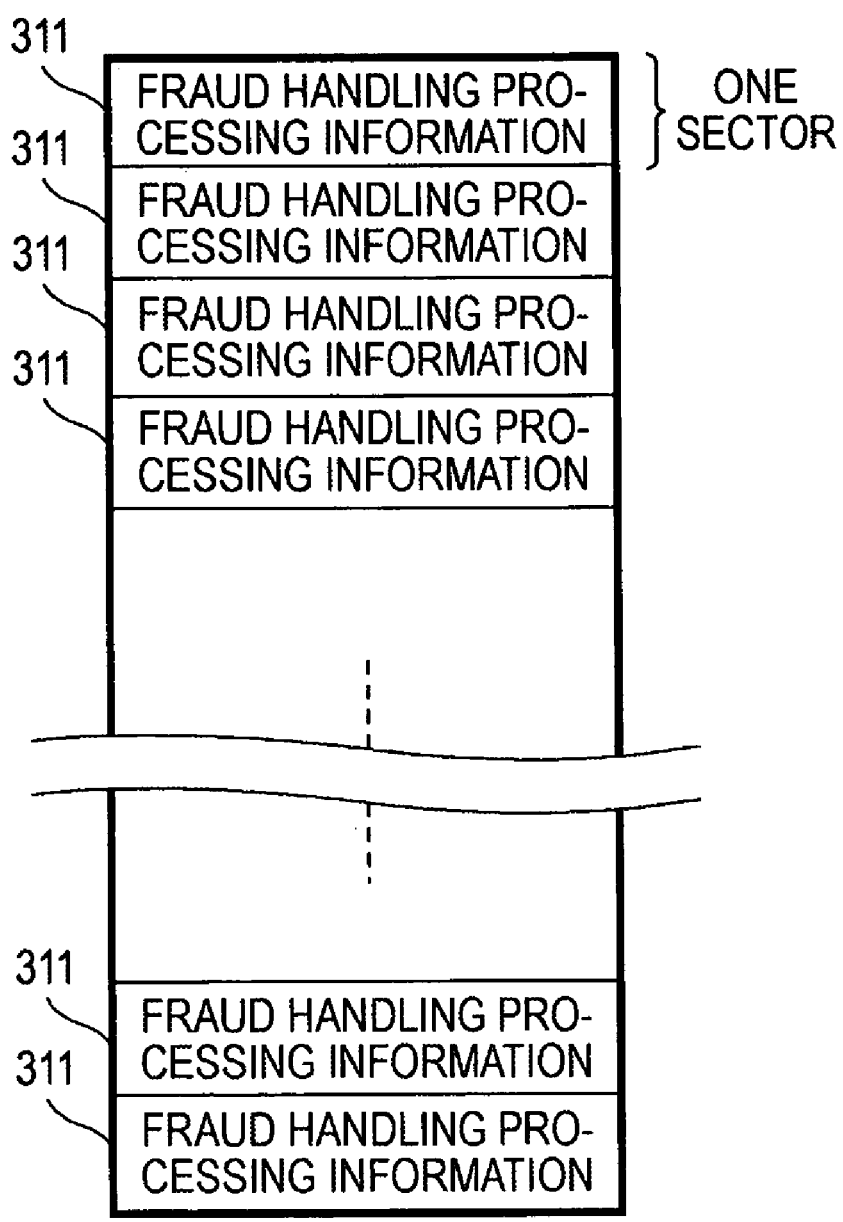
FIG. 4 is a schematic drawing to describe a storage area example on HDD (after fraud handling processing)

FIG. 4 shows the storage area in the HDD 30 after fraud handling processing is performed. Since fraud handling processing information 311 is 512 bytes, the same as the capacity of one sector, the HDD 30 is all filled with the fraud handling processing information 311. The first sector may store information for identifying the HDD 30 as the HDD identification information 3011 rather than the fraud handling processing information 311, so that the HDD 30 can be used as storage still after fraud handling processing. If the fraud handling processing information 3012 exists as storage area before fraud handling processing, only the sector may be left and other sectors may be used as a job file area 312. In this case, it is made possible to leave a plurality of past histories of fraud handling processing.

In the first embodiment, after the data processing apparatus 20 performs fraud handling processing, it is made possible to completely prevent information from leaking from the HDD 30 removed from the data processing apparatus 20.

Trace of performing the fraud handling processing by the data processing apparatus 20 can be left in the HDD 30.

Figure 6:
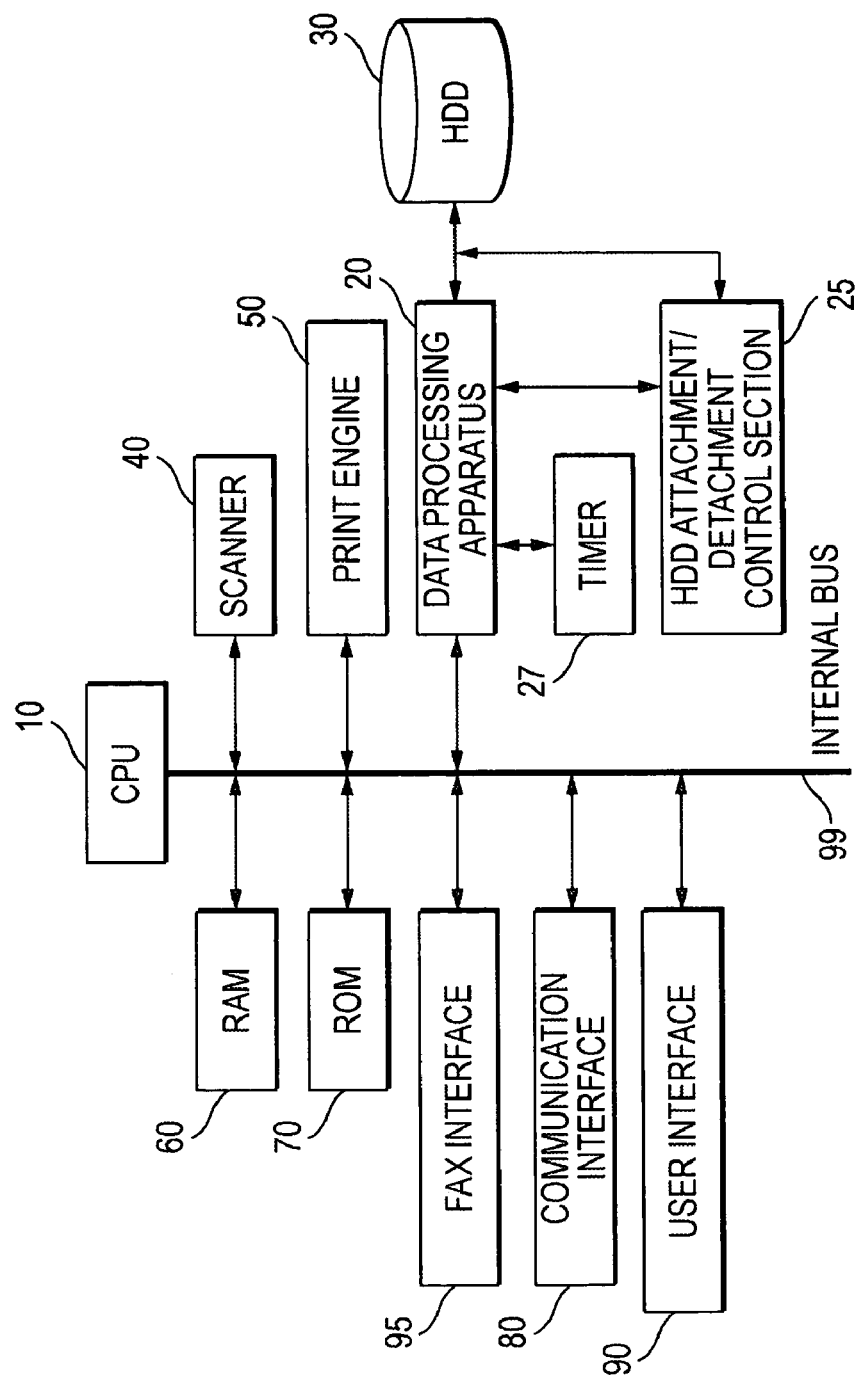
FIG. 6 is a schematic block diagram to illustrate hardware of a second data processing apparatus.
Figure 7:
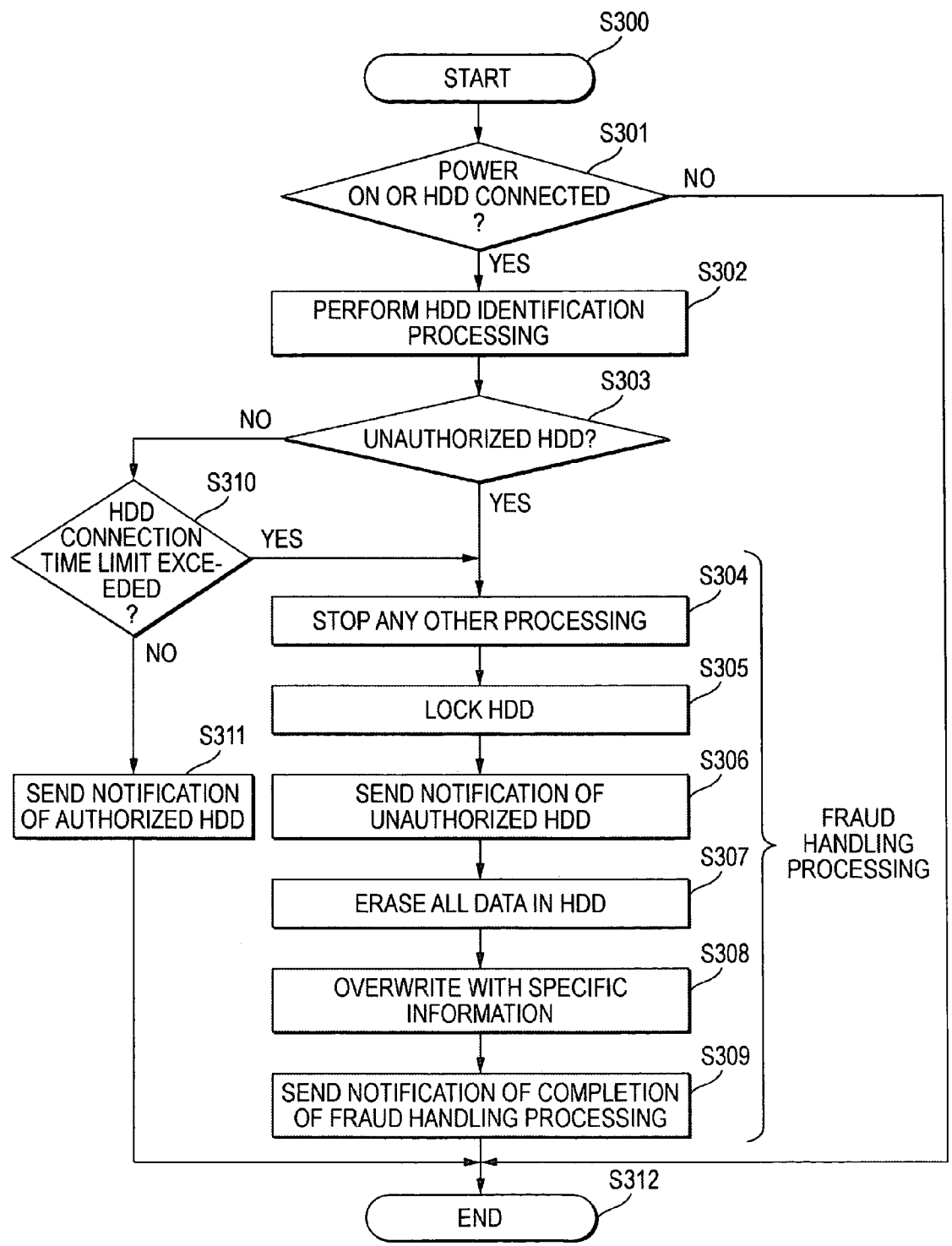
FIG. 7 is a flowchart of a second fraud handling processing example.

A second embodiment of the invention will be discussed with FIGS. 6 and 7. Although a conceptual module configuration example is similar to that in the first embodiment (FIG. 1), mainly the function of a part of a fraud handling module 24 is used and a timer 27 is used. Modules identical with or similar to those of the first embodiment will not be discussed again. FIG. 6 shows a hardware example of a data processing apparatus 20. It is almost the same as that in the first embodiment (FIG. 2) except that the timer 27 is connected to the data processing apparatus 20.

An outline of the second embodiment of the invention will be discussed.

The data processing apparatus 20 determines whether or not connected storage is unauthorized and performs predetermined fraud handling processing if the storage is unauthorized. Although the determination result indicates that the storage is not unauthorized, if the time interval between HDD 30 being taken out and being again connected exceeds a predetermined time, the following fraud handling processing is executed:

(1) Stop processing other than the HDD fraud handling processing.
(2) Physically lock the HDD.
(3) Analyze the description of the fraud and send a notification.
(4) Erase data in all areas of the HDD.
(5) Overwrite the erasion areas with specific information.
(6) Send a notification of completion of the fraud handling processing.

The fraud handling processing performed in the second embodiment will be discussed with a flowchart of FIG. 7. Steps almost the same as those of the fraud handling processing performed in the first embodiment will be discussed with reference to the step numbers in FIG. 5.

Steps S301 to S309 are similar to steps S101 to S109.

If it is not determined at step S303 that the HDD is unauthorized (NO at step S303), the process goes to step S310.

At step S310, whether or not the HDD connection time limit is exceeded is determined. That is, for the operator to perform fraud handling processing, the operator may have to once remove the HDD 30 from the data processing apparatus 20 still after HDD determination processing (step S302). However, if the time during which the HDD 30 is removed is not a time to such an extent that the HDD 30 is replaced, it is not necessary to again perform the HDD determination processing (step S302) from the beginning. In contrast, if the time during which the HDD 30 is long, even if a fraud determination module 22 does not determine that the HDD is unauthorized, fraud handling processing needs to be performed. Then, at step S310, the time during which the HDD 30 is removed is measured with the timer 27 and whether or not the time exceeds a predetermined time is determined. If the time exceeds the predetermined time, fraud handling processing at step S304 to S309 is performed; if the time does not exceed the predetermined time, the process goes to step S311.

Step S311 is similar to step S110.

If it is determined at step S310 that the time exceeds the predetermined time, a notification that the HDD 30 connection wait time is exceeded is sent at step S306.

The state of the storage area on the HDD 30 before fraud handling processing and that after fraud handling processing are similar to those in the first embodiment previously described with FIGS. 3 and 4.

In the second embodiment, after the data processing apparatus 20 performs fraud handling processing, it is made possible to completely prevent information from leaking from the HDD 30 removed from the data processing apparatus 20.

Trace of performing the fraud handling processing by the data processing apparatus 20 can be left in the HDD 30.

If the HDD 30 is removed and the time during which the HDD 30 is removed is longer than the predetermined time, fraud handling processing is forcibly performed, so that it is made harder to perform unauthorized (illegal) processing and malfunction of the data processing apparatus 20, etc., can be prevented.

A third embodiment of the invention will be discussed with FIGS. 8 and 9. Although a conceptual module configuration example is similar to that in the first embodiment (FIG. 1), mainly the function of a part of a fraud handling module 24 is used. Modules identical with or similar to those of the first embodiment will not be discussed again. A hardware example of a data processing apparatus 20 is also the same as that in the first embodiment (FIG. 2) or that in the second embodiment (FIG. 6).

An outline of the third embodiment of the invention will be discussed.

The data processing apparatus 20 determines whether or not job data stored in storage is unauthorized (illegal) and performs the following fraud handling processing if the job data is unauthorized (illegal). The job data is data generated each time a job occurs in the data processing apparatus 20, and a job file is a file created each time a job occurs in the data processing apparatus 20.

(1) Stop processing other than the HDD fraud handling processing.
(2) Physically lock the HDD.
(3) Analyze the description of the fraud and send a notification.
(4) Erase the job data.
(5) Overwrite the erasure areas with specific information.
(6) Send a notification of completion of the fraud handling processing.

The fraud handling processing performed in the third embodiment will be discussed with a flowchart of FIG. 9. Steps almost the same as those of the fraud handling processing performed in the first embodiment will be discussed with reference to the step numbers in FIG. 5.

At step S401, whether or not a job file is read is determined. If a job file is not read (NO at step S401), the process is terminated without performing fraud handling processing (step S411).

At step S402, identification processing of the job file is performed. This means that when the HDD 30 is read, job file identification data previously stored together with job data of the HDD 30 is read.

At step S403, whether or not the job file is unauthorized (illegal) is determined by whether or not the job data of the HDD 30 and the identification code of the job file read at step S402 match. If they do not match, the job file is unauthorized (illegal) (YES at step S403). If they match, the job file is not unauthorized (illegal) (NO at step S403). Notification that the job file is authorized is sent and the fraud handling module 24 displays a message to the effect that the job file is authorized on a user interface 90 through a user interface 21 (step S410).

Steps S404 and S405 are similar to steps S104 and S105.

At step S406, the unauthorized (illegal) job file is displayed on the user interface 90 through the user interface 21. As the description of the fraud to be sent, first, the unauthorized job file identification code and the fact that the job file is unauthorized (illegal) are reported. Subsequently, the HDD 30 area is scanned and if a code indicating that fraud handling processing was performed in the past is detected, information code concerning the past fraud handling processing (identification code unique to the apparatus performing the fraud handling processing/job information/date and time/operator ID, etc.,) stored following that code and the fact that fraud handling processing was performed in the past are reported.

At step S407, the unauthorized (illegal) job file in the HDD 30 is erased. For example, National Security Agency (NSA) recommendation method (overwrite with random numbers at the first and second times and overwrite with fixed values at the third time) or the like is used. Accordingly, it is made impossible to interpret the information stored before erasion.

Figure 8:
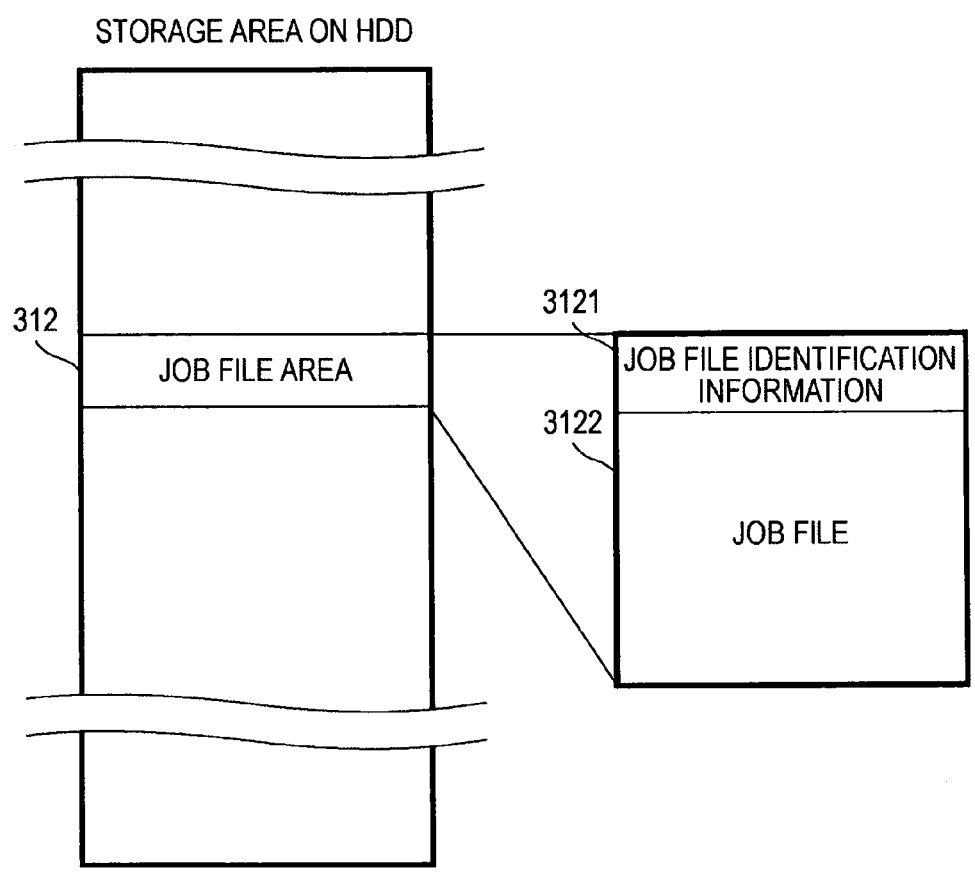
FIG. 8 is a schematic drawing to describe a storage area example on HDD.
Figure 9:
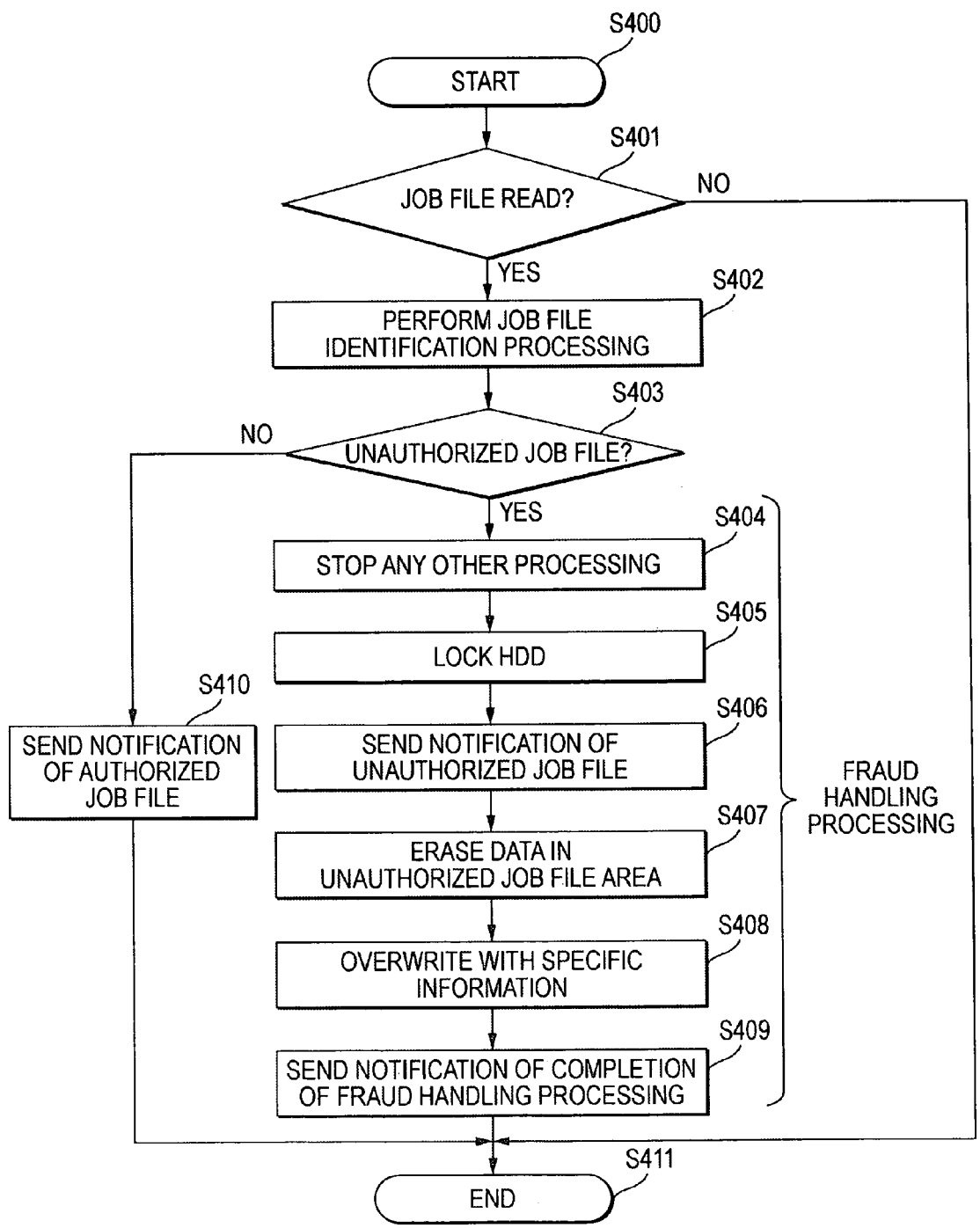
FIG. 9 is a flowchart of a third fraud handling processing example.

The job file in the HDD 30 has a job file area 312 in the storage area on the HDD 30, and job file identification information 3121 and a job file 3122 exist in the area, as shown in FIG. 8. The job file identification code may be a code assigned for each job file or may be a hash value of job file data.

At step S408, the area with data erased at step S407 (job file area 312) is overwritten with specific information. This means that the job file area 312 of the HDD 30 is repeatedly overwritten with information code concerning the fraud handling processing (code indicating the fraud handling processing/identification code unique to the apparatus in which the data processing apparatus 20 is installed/job information/date and time/operator ID/past fraud information, etc.). Since the fraud handling processing information is made up of one sector (512 bytes), each sector of the HDD is overwritten with similar data.

Step S409 is similar to step S109.

In the third embodiment, malfunction of the apparatus caused by unauthorized (illegal) tampering with the effective data portion or the like can be prevented.

Figure 10:
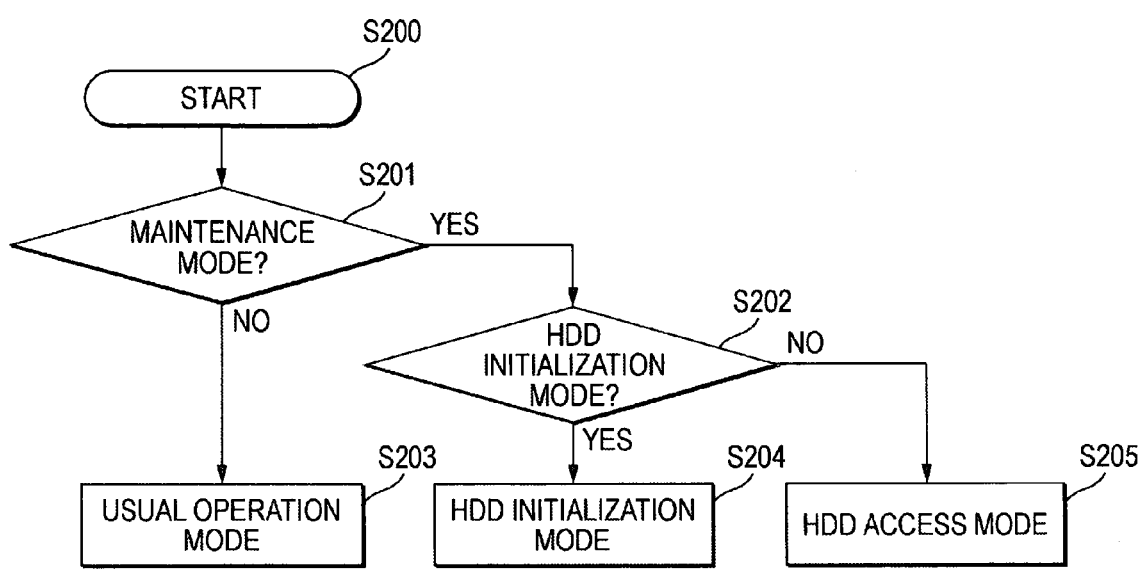
FIG. 10 is a flowchart of a fourth fraud handling processing example.

A fourth embodiment of the invention will be discussed with FIG. 10. Although a conceptual module configuration example is similar to that in the first embodiment (FIG. 1), mainly the function of a part of a fraud handling module 24 is used. Modules identical with or similar to those of the first embodiment will not be discussed again. A hardware example of a data processing apparatus 20 is also the same as that in the first embodiment (FIG. 2) or that in the second embodiment (FIG. 6).

An outline of the fourth embodiment of the invention will be discussed.

An HDD initialization mode and an HDD access mode are provided in a maintenance mode that can be executed by a service engineer, etc., having a special authority to operate the data processing apparatus 20 and is not open to general users. In the two modes, the following processing is performed without performing identification of unauthorized HDD or fraud handling processing in the usual operation mode as in the first to third embodiments described above:

A. HDD Initialization Mode (Step S204)

The HDD initialization mode is a mode of initializing a newly attached HDD 30 and is executed in the following sequence:

(1) The service engineer enters a start command of the HDD initialization mode. Using a password, etc., only the service engineer is permitted to start the HDD initialization mode.
(2) When the HDD initialization mode is entered, first, processing other than the HDD initialization processing is stopped (for example, physical shutdown of a FAX/communication net line of a FAX interface 95 and a communication interface 80, etc.).
(3) The service engineer attaches an HDD 30. This HDD 30 is newly placed in the data processing apparatus 20.

(4) The HDD 30 is physically locked for fixing the HDD 30 to a state in which the HDD 30 cannot be taken out as in the first embodiment. The subsequent processing is performed for the identified HDD and the HDD is prevented from being replaced, etc., during the processing. For this purpose, the data processing apparatus 20 issues a command of fixing the HDD 30 to an HDD attachment/detachment control section 25, which then electrically or mechanically inhibits attachment/detachment of the HDD 30.

(5) All new HDD area is overwritten with harmless data to the apparatus for erasion processing. Although the HDD is new, erasion processing is performed as a precaution against unauthorized HDD disguising a new HDD. For example, National Security Agency (NSA) recommendation method (overwrite with random numbers at the first and second times and overwrite with fixed values at the third time) or the like is used. Accordingly, it is made impossible to interpret the information stored before erasion.

(6) HDD management information (HDD identification information, etc.,) is stored for making it possible to later use the HDD.

(7) The service engineer enters a termination command of the HDD initialization mode.

(8) The HDD 30 is unlocked.

(9) Stopping of processing other than the HDD initialization processing is released. This means that the state is restored to the state before the HDD initialization mode is started.

The HDD initialization mode capable of performing the processing as described above is provided, whereby malfunction of the apparatus caused by already existing data in a newly attached HDD or the like can be prevented and the HDD can be initialized safely and securely.

B. HDD Access Mode (step S205)

The HDD access mode is a mode used when the contents of HDD 30 placed in a different faulty apparatus are checked in the apparatus and is executed in the sequence described below. To check the contents of HDD, the data stored in the HDD (image data, etc.,) is printed or displayed and the data that cannot be accessed in the faulty apparatus is accessed. A plurality of HDDs can be placed in the apparatus. It is assumed that the HDD placed from the first in the apparatus is HDD 30 and the HDD placed in the different faulty apparatus is HDD (A).

(1) The service engineer enters a start command of the HDD access mode. Using a password, etc., only the service engineer is permitted to start the HDD access mode.

(2) Processing other than print processing of the data in the HDD (A) or display processing of the data on the user interface 90 is stopped (for example, physical shutdown of the FAX/communication net line of the FAX interface 95 and the communication interface 80, etc.).

(3) The service engineer attaches the HDD (A). This HDD (A) was placed in the different apparatus.

(4) The HDD (A) is physically locked for fixing the HDD 30 to a state in which the HDD (A) cannot be taken out as in the first embodiment. The subsequent processing is performed for the identified HDD and the HDD (A) is prevented from being replaced, etc., during the processing. For this purpose, the data processing apparatus 20 issues a command of fixing the HDD (A) to the HDD attachment/detachment control section 25, which then electrically or mechanically inhibits attachment/detachment of the HDD (A). The HDD 30 as well as the HDD (A) may be locked.

(5) The service engineer accesses the HDD (A) (the contents of the HDD (A) can only be printed or can only be displayed on the user interface 90).

(6) The service engineer enters a termination command of the HDD access mode.

(7) The print processing of the data in the HDD (A) and the display processing of the data on the user interface 90 are stopped.

(8) The apparatus is initialized (deletion of the data written into RAM 60 and the data written onto the HDD 30 placed from the first in the apparatus or the data written onto the HDD (A) in the work described above). This means that the state is restored to the state before the HDD access mode is started.

(9) The HDD (A) is unlocked. If the HDD 30 is also locked, it is also unlocked.

(10) The service engineer takes out the HDD (A).

(11) Stopping of the print processing of the data in the HDD 30, the display processing of the data on the user interface 90, and any other processing is released.

The HDD access mode for performing the processing as described above is provided, whereby the HDD connected to a different apparatus can be accessed safely.

The described program can also be stored on a storage medium, in which case the invention can also be grasped as follows, for example:

A data processing apparatus readable record medium recording a data processing program for causing a data processing apparatus to implement:

a determination function of determining whether or not connected storage is unauthorized; and a fraud handling function of erasing information in all area of the storage as a fraud handling processing if the determination function determines that the connected storage is unauthorized.

A data processing apparatus readable record medium recording a data processing program for causing a data processing apparatus to implement:

a determination function of determining whether or not job data stored in storage is unauthorized; and a fraud handling function of erasing information in an unauthorized job data area in the storage as a fraud handling processing if the determination function determines that the job data is unauthorized.

A data processing apparatus readable record medium recording a data processing program started in a maintenance mode for causing a data processing apparatus to implement a fraud handling function, at the storage initialization time of initializing newly placed storage, of overwriting all area of the newly placed storage with predetermined data.

A data processing apparatus readable record medium recording a data processing program started in a maintenance mode for causing a data processing apparatus to implement a storage access processing function of performing access processing to storage used in a different data processing apparatus.

The expression "data processing apparatus readable record medium recording a program" is used to mean a record medium read by a computer recording a program, used to install and execute a program, to distribute a program, etc.

The record media include "DVD-R, DVD-RW, DVD-RAM, etc.," of digital versatile disk (DVD) and standard laid down in DVD Forum, "DVD+R, DVD+RW, etc.," of standard laid down in DVD+RW, read-only memory (CD-ROM), CD recordable (CD-R), CD rewritable (CD-RW), etc., of compact disk (CD), magneto-optical disk, flexible disk (FD), magnetic tape, hard disk, read-only memory (ROM), electrically erasable and programmable read-only memory (EEPROM), flash memory, random access memory (RAM), etc., for example.

The described program or a part thereof can be recorded in any of the described record media for retention, distribution, etc. The described program or a part thereof can also be transmitted by communications using a transmission medium such as a wired network used with a local area network, a metropolitan area network (MAN), a wide area network (WAN), the Internet, an intranet, an extranet, etc., or a wireless communication network or a combination thereof, etc., for example, and can also be carried over a carrier wave.

Further, the described program may be a part of another program or may be recorded in a record medium together with a different program.

What is claimed is:

1. A data processing apparatus comprising:
   a determination section that is connected to a storage and determines whether or not the storage is unauthorized; and
   a fraud handling section that erases information in all area of the storage as a fraud handling processing if the determination section determines that the connected storage is unauthorized, wherein
   the determination section reads data stored in a storage identification storage area in the storage and compares the data and an identification code of the data processing apparatus to determine whether or not the storage is unauthorized.

2. A data processing apparatus comprising:
   a determination section that determines whether or not job data stored in a storage is unauthorized; and
   a fraud handling section that erases information in an unauthorized job data area in the storage as a fraud handling processing if the determination section determines that the job data is unauthorized, wherein
   the determination section reads data stored in a storage identification storage area in the storage and compares the data and an identification code of the data processing apparatus to determine whether or not the storage is unauthorized.

3. The data processing apparatus as claimed in claim 1, wherein the fraud handling section stops a processing other than the fraud handling processing or restrict taking out the storage physically while the fraud handling section is performing the fraud handling processing.

4. The data processing apparatus as claimed in claim 1, wherein if the determination section determines that the storage is unauthorized or determines that the job data is unauthorized, the fraud handling section sends a notification of the description of the fraud.

5. The data processing apparatus as claimed in claim 1, wherein the fraud handling section overwrites the erasure area with specific information to erase the information in all area of the storage.

6. The data processing apparatus as claimed in claim 2, wherein the fraud handling section shut down external physical connection to stop the processing other than the fraud handling processing.

7. The data processing apparatus as claimed in claim 3, wherein the fraud handling section sends a notification as to whether or not the fraud handling processing was performed in the past as the notification of the description of the fraud.

8. The data processing apparatus as claimed in claim 5, wherein the specific information with which the erasion area is overwritten by the fraud handling section is encrypted data.

9. The data processing apparatus as claimed in claim 1, wherein even if the determination section determines that the storage is not unauthorized, if the time interval between the storage being taken out and being again connected exceeds a predetermined time, the fraud handling section performs the fraud handling processing.

10. The data processing apparatus as claimed in claim 9, which further comprises a predetermined time specification section that makes it possible to specify the predetermined time.

11. The data processing apparatus as claimed in claim 9, which further comprises a fraud handling processing selection section that makes it possible to select execution or no execution of the fraud handling processing by the fraud handling section if the predetermined time is exceeded.

12. A data processing apparatus, which comprises:
    a fraud handling section that, at a storage initialization time of initializing newly placed storage, performs an initialization processing that overwrites all area of the newly placed storage with predetermined data.

13. The data processing apparatus as claimed in claim 12, wherein the fraud handling section stops a processing other than the initialization processing or restricts taking out the storage physically while the fraud handling section is performing the initialization processing.

14. A data processing method comprising:
    determining whether or not connected storage is unauthorized; and
    erasing information in all area of the storage so that the information cannot be interpreted as a fraud handling processing if it is determined that the connected storage is unauthorized, wherein
    determining whether or not connected storage is unauthorized includes reading data stored in a storage identification storage area in the storage and comparing the data and an identification code of a data processing apparatus carrying out the data processing method to determine whether or not the storage is unauthorized.

15. A non-transitory computer readable medium storing a program causing a data processing apparatus to execute a process for performing a fraud handling processing comprising:
    determining whether or not connected storage is unauthorized; and
    erasing information in all area of the storage as a fraud handling processing if it is determined that the connected storage is unauthorized, wherein
    determining whether or not connected storage is unauthorized includes reading data stored in a storage identification storage area in the storage and comparing the data and an identification code of the data processing apparatus to determine whether or not the storage is unauthorized.

* * * * *